E. M. JOHNSON.
MOTOR CYCLE SIDE CAR.
APPLICATION FILED APR. 1, 1912.
1,069,788.
Patented Aug. 12, 1913.
2 SHEETS—SHEET 1.
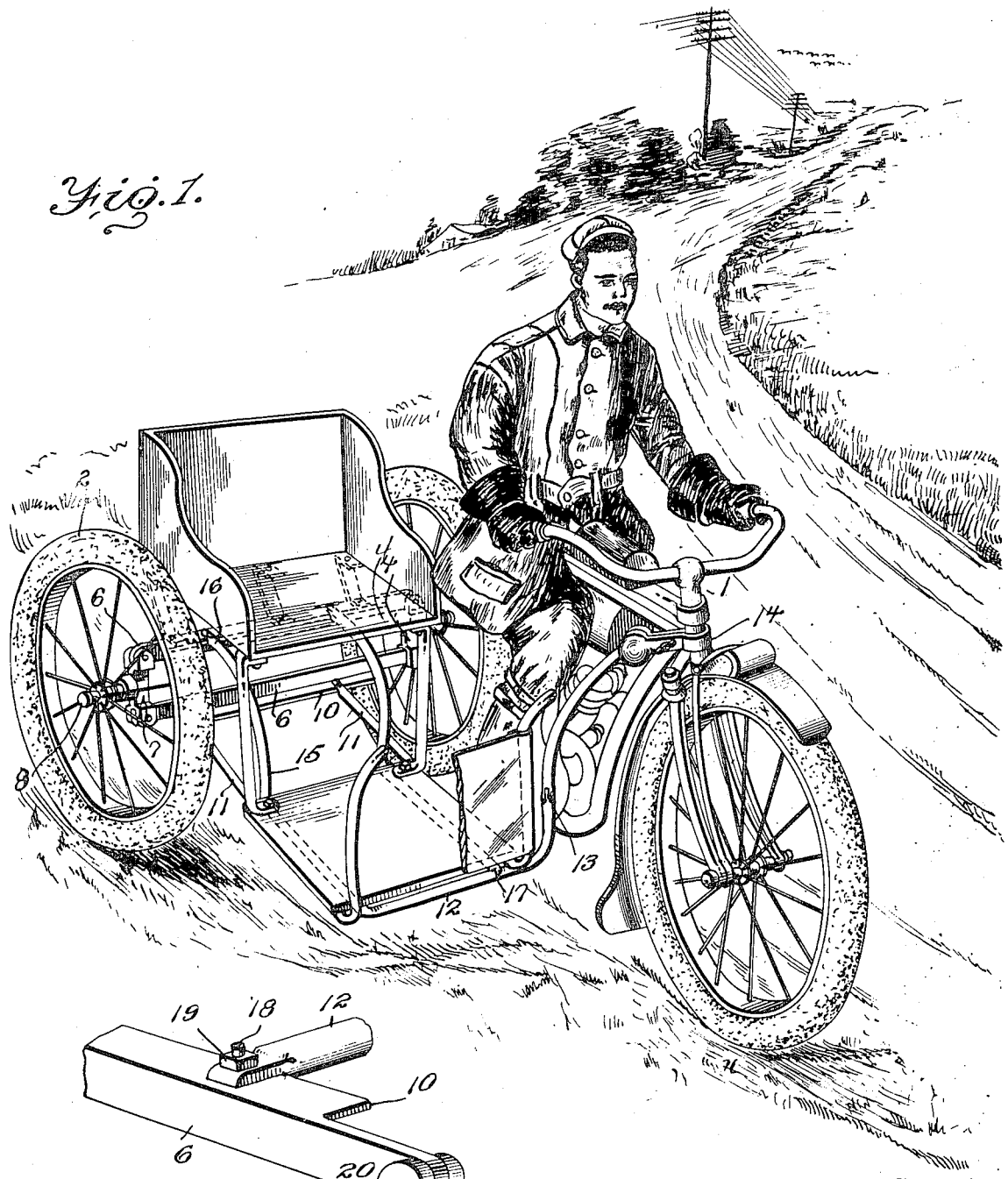
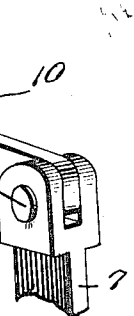
Witnesses
Inventor
Earl M. Johnson
By
Attorneys

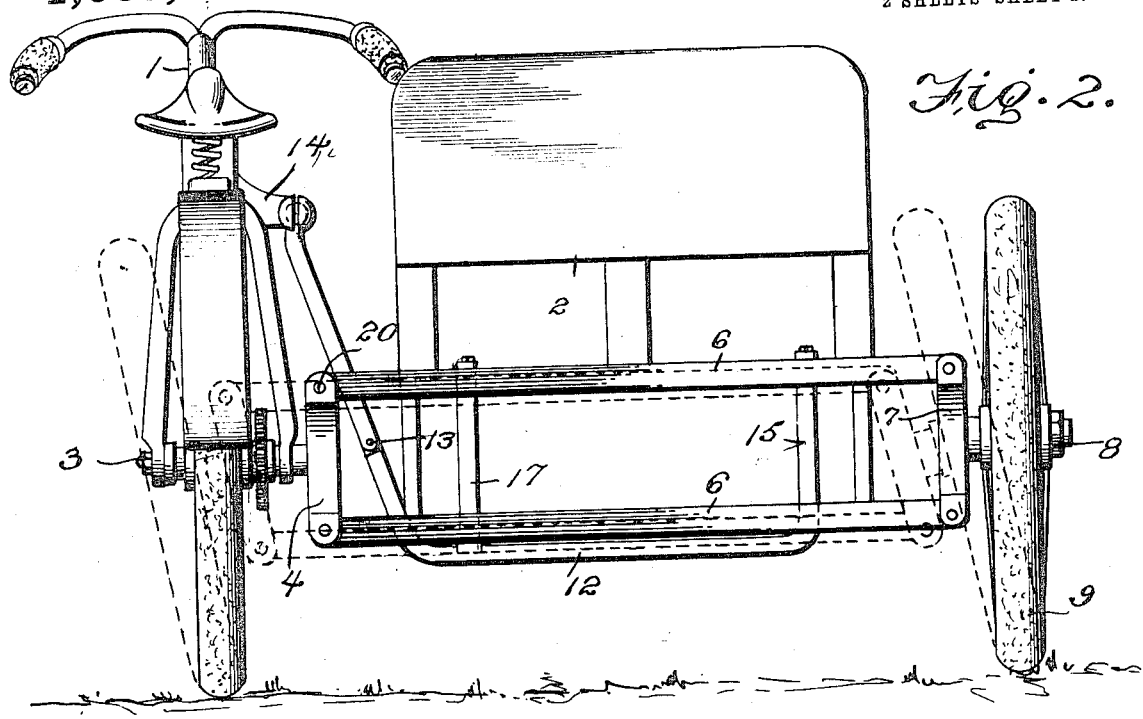
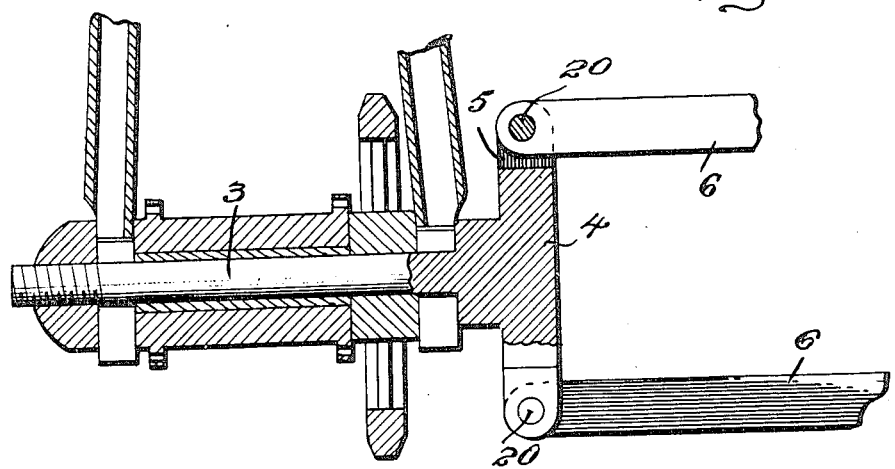

UNITED STATES PATENT OFFICE.

EARL M. JOHNSON, OF HARLAN, IOWA.

MOTOR-CYCLE SIDE CAR.

1,069,788.

Specification of Letters Patent. Patented Aug. 12, 1913.

Application filed April 1, 1912. Serial No. 687,784.

*To all whom it may concern:*

Be it known that I, EARL M. JOHNSON, a citizen of the United States, residing at Harlan, in the county of Shelby and State of Iowa, have invented certain new and useful Improvements in Motor-Cycle Side Cars, of which the following is a specification.

This invention relates to motor-cycle side cars and has for its object the provision of means whereby, when the vehicle is turning corners or rounding curves, the outer side wheel of the side car will be caused to assume a pitch or inclination equal to and in the same direction with the pitch or inclination assumed by the motor-cycle.

A secondary object is to provide a device for the stated purpose which will be simple in construction and which may be readily applied to the motor-cycle and the side car without increasing the cost of either one.

A further incidental object of the invention is to provide improved means for supporting the side car, all of which will fully appear as the description of the invention proceeds.

The invention is illustrated in the accompanying drawings in which:—

Figure 1 is a perspective view of a motor-cycle with a side car connected therewith and equipped with my improvements; Fig. 2 is a rear elevation, showing the position assumed by the wheels when rounding a curve in dotted lines; Fig. 3 is an enlarged detail sectional elevation of a portion of the axle; Fig. 4 is an enlarged detail perspective view of a part of the device to more clearly illustrate some structural details.

The motor-cycle 1 may be of any preferred type and the side car 2 embodies a chair or seat and a seat-supporting frame which is detachably connected to the motor-cycle.

In carrying out my invention, I employ an axle having a spindle or stub axle 3 upon which the rear hub of the motor-cycle is mounted in the usual manner, and this stub axle or spindle is provided at one end with a head 4 rigid with the spindle. In the normal position of the parts, that is, the position assumed when traveling along a straight road, this head 4 will be vertical, as shown in Fig. 3 and in full lines in Fig. 2, but when the vehicle turns a corner or rounds a curve, the motor-cycle will lean to the inner side of the curve and consequently the rear wheel thereof will assume an inclination or pitch, indicated in dotted lines in Fig. 2. As the stub axle or spindle 3 is secured in the hub of the wheel, the inclination or pitch will be imparted directly to the axle, so that the head 4 thereof will be given a corresponding inclination or pitch, as indicated by the dotted lines. The upper and lower ends of this head 4 are forked or bifurcated, as shown at 5, and in the said forks or bifurcations I pivotally secure the ends of links or bars 6 which extend laterally at a right angle to the motor-cycle and are of such length as to project beyond the side of the side car 2, as clearly shown. The outer ends of these bars 6 are pivotally secured to the upper and lower ends of a head 7, similar in all respects to the head 4, from which extends a spindle or stub axle 8 rigid with the head and corresponding in all respects to the spindle or stub axle 3. Upon this spindle or stub axle 8 is mounted the outer carrying wheel 9 which supports the side car. The upper and lower bars 6 are preferably angle-bars whereby they are provided with forwardly projecting flanges or shelves 10 to which the frame of the side car may be secured. In the drawings, I have shown the side car frame as embodying longitudinal sills or beams 11 having their rear ends secured to the flange or shelf 10 of the lower bar 6, and a suspension frame or bar 12 is provided consisting of two members hinged together, as shown at 13, the forward member extending upwardly and forwardly from the said hinge 13 to be engaged by a clamp 14 secured upon the steering head of the motor-cycle. The clamp forms a ball and socket joint with the said suspension bar or frame, so that the said bar or frame may readily follow the movements of the side car or the motor-cycle in traveling over rough or uneven roads and in turning corners without causing the side car to rise from the ground and thereby tend to upset. This free relative movement of the motor-cycle and the side car is further accommodated by the hinge 13, as will be readily understood. The lower or rear member of this suspension bar or frame extends across the front of the side car and is then extended backwardly under the foot rest of same to about the vertical plane of the front edge of the seat or chair, whence it is carried upward, as shown at 15, and then carried backward, as indicated at 16, its rear extremity being rigidly secured to the flange or shelf 10 of the upper transverse bar 6. In order to more securely support the chair, the frame 12 is preferably provided with a branch 17 which extends rearwardly to a point under the chair and then upwardly and rearwardly to be rigidly secured to the upper bar 6. The rear ends of this frame 12 are rigidly secured to the shelf or flange of the upper bar 6 by bolts 18 equipped with nuts 19, while the ends of the bars are connected with the heads 4 and 7 by pivot pins 20 which are preferably removable in order that the side car may be easily detached from the motor-cycle when it is desired to use the motor-cycle without the side car.

From the foregoing description, taken in connection with the accompanying drawings, it will be seen that I have provided an attachment for motor-cycles consisting essentially of a collapsible or extensible axle by which the rear portion of the side car is supported, and by which the tilting of the motor-cycle will be transmitted directly to the supporting wheel of the side car, so that the said wheel will be likewise tilted and the vehicle consequently enabled to turn corners or pass around curves without liability of upsetting.

By referring to Fig. 2, it will be observed that when the motor-cycle is tilted in making a turn the stub axle or spindle 3 will be brought to an angle from the horizontal, and the head 4, rigid with the said spindle, will be likewise tilted. In the position illustrated by dotted lines the upper end of the head 4 has been tilted away from the side car, while the lower end thereof has been swung toward the side car, and this movement of the head has been, of course, transmitted directly to the upper and lower transverse supporting bars 6 of the axle, so that the said bars have been moved in opposite directions, longitudinally, and the outer head 7 consequently caused to assume an inclination equal to that of the head 4, whereby the two heads and said bars retain their parallelism. As the head 7 is tilted, the stub axle or spindle 8 rigid therewith will likewise be tilted or canted, and the ground wheel 9 mounted on said axle will, of course, be given a pitch, as indicated in dotted lines, equal to that of the motor-cycle, so that the corner may be passed without any liability of an upset.

Should it be desired to use the motor-cycle without the side car, the pivot pins 20 connecting the upper and lower bars 6 with the ends of the head 4 may be removed and the clamp 14 removed from the steering head of the motor-cycle, thereby leaving the motor-cycle free of the side car, as will be readily understood.

The device is exceedingly simple in its construction and the arrangements of its parts, and may be readily applied to any motor-cycle and side car. The forked construction of the ends of the head effectually prevents movement of the upper and lower parallel bars laterally of the heads, so that accidental release or disengagement of the parts is avoided.

It will be understood, of course, that the wheels may be pitched to either side, but that they will always remain parallel to each other, so that whether the vehicle is turning to the right or to the left, the turn may be safely made without any reduction in speed.

Having thus described my invention, what is claimed is:

1. The combination of a motor-cycle, a spindle fitted in the rear wheel of the motor-cycle and having a rigid head formed on one end, said head projecting above and below the spindle, bars pivoted to the upper and lower ends of said head and extending laterally therefrom, a second spindle having a head rigid with one end and projecting above and below the same and having its upper and lower ends pivoted to said upper and lower bars, a supporting wheel mounted on said last-named spindle, a frame secured rigidly to said upper and lower bars and projecting forwardly therefrom, a swinging connection between the front end of said frame and the front end of the motor-cycle, and a seat supported on said frame in advance of the said upper and lower pivoted bars.

2. The combination with a motor-cycle, and a side car, of a tilting axle fitting at one end in the rear wheel of the motor-cycle and having a supporting wheel fitted on its opposite end, a supporting frame secured rigidly to said axle and to the bottom of the car and having an upstanding front member, a connecting member having its lower end hinged to said upstanding member, and a clamp secured to the motor-cycle and connected to the upper end of said connecting member by a ball and socket joint.

In testimony whereof I affix my signature in presence of two witnesses.

EARL M. JOHNSON. [L. S.]

Witnesses:
C. W. HARRIS,
G. W. CULLISON.